United States Patent [19]
Thomson et al.

[11] Patent Number: 5,242,590
[45] Date of Patent: Sep. 7, 1993

[54] LIGHTWEIGHT, ANTI-REWET, MODULAR STYLE DISC SECTOR

[75] Inventors: William F. Thomson, Milford; Alfred F. Blichmann, Dunbarton; John E. Leddy, Amherst, all of N.H.

[73] Assignee: Ingersoll-Rand Company, Woodcliff Lake, N.J.

[21] Appl. No.: 923,124

[22] Filed: Jul. 31, 1992

[51] Int. Cl.⁵ .............................................. B01D 33/23
[52] U.S. Cl. .................................. 210/331; 210/347; 210/486
[58] Field of Search ............... 210/486, 322, 324, 325, 210/328, 329, 331, 346, 347, 321.67, 359, 380.1, 380.3, 381, 487

[56] References Cited

U.S. PATENT DOCUMENTS

| | | | |
|---|---|---|---|
| 3,291,312 | 12/1966 | Peterson | 210/486 |
| 3,438,505 | 4/1969 | Luthi | 210/486 |
| 3,610,419 | 10/1971 | Vallee et al. | 210/486 |
| 4,207,190 | 6/1980 | Sheaffer | 210/232 |
| 4,676,901 | 6/1987 | Ragnegard | 210/331 |
| 4,699,716 | 10/1987 | Barra | 210/486 |
| 4,702,833 | 10/1987 | Miyata | 210/333.01 |
| 4,708,797 | 11/1987 | Baur et al. | 210/330 |
| 5,062,968 | 11/1991 | Warning | 210/771 |
| 5,100,551 | 3/1992 | Pall et al. | 210/346 |

Primary Examiner—Frank Sever
Attorney, Agent, or Firm—Robert F. Palermo

[57] ABSTRACT

A rotating disc filter has a plurality of sectors removably mounted on drainage and support structures which are fixed on a rotating hub. The drainage and support structure has flow channels and internal baffles which serve to trap filtrate to keep filtrate from re-wetting filter cake built up on the sectors prior to removal of the filter cake from the sectors.

11 Claims, 4 Drawing Sheets

LIGHTWEIGHT, ANTI-REWET, MODULAR STYLE DISC SECTOR

BACKGROUND OF THE INVENTION

This invention relates to rotating filter disks; more particularly, this invention relates to a modular filter disk in which individual sectors—to create a disk—are removably mounted on towers which support, and may also drain, the sectors as they are rotated into, and out of, a slurry.

The prior art is replete with disk filters utilized to filter slurries such as might exist, for example, in the paper and pulp industries. Typically, and especially in larger sizes, the disks are comprised of adjacent sectors mounted on a rotating shaft so that successive sectors of the disk are rotated into, and subsequently out of, the slurry. During the immersion of each sector in the slurry, a pressure differential is applied to the sector causing the liquid in the slurry to flow through flow channels in each sector toward a central core, or drainage, channel while a so-called filter cake adheres to, and builds up on, the outside surface of each sector.

Upon emergence of a sector from the slurry, a filter cake has built up on each sector and this cake is removed, first by ceasing application of the differential pressure and then, subsequently, by the application of a knock-off shower designed to peel away the substantially dry cake which has adhered to the sector. This cake is then collected prior to the re-entry of a sector into the slurry to begin another cycle.

Demands for increased filtration capacities have led to ever increasing filter sizes, with some commercial applications now ranging to 18" or more in diameter. When, as is inevitable, maintenance requires the repair or replacement of sectors, the sector structure has to be dismantled from the hub on which the sector is mounted. Not only is the removal process awkward because a worker has to get into the crowded space around a hub to dismantle a sector, but sector size and weight dictate possibly two or more workers to manage the removal operation.

As those skilled in the art will appreciate, once the filter cake has built-up on a sector and the pressure differential has been removed prior to the filter cake removal from the surface of a sector, re-wetting of the essentially dry filter cake by filtrate—insufficiently drained from the sector structure—dribbling in reverse flow, so to speak, may occur.

Accordingly, it would be advantageous to create a modular assembly so that certain parts of what would be a normal sector installation remain more or less permanently affixed to the rotating hub while the individual sectors can be simply and separately unbolted in a one man operation. It would also be advantageous to provide a disc sector having improved anti re-wet features.

SUMMARY OF THE INVENTION

In accordance with one aspect of the invention, a disk filter is comprised of sectors each with first and second surfaces having filtrate collection channels and a radially oriented hollow bore along a radial centerline of the sector and in flow communication with the filtrate collection channels; and structural support means, projecting radially outwardly from a rotatable hub of the disk filter and adapted to fit within the radially oriented hollow bore of each sector, for securing each sector to the hub in a spaced relationship with respect to adjacent disks, and for providing radially outboard installation and removal capability for each said sector.

The foregoing and other aspects will become apparent from the following detailed description of the invention when considered in conjunction with the accompanying drawing figures.

DETAILED DESCRIPTION

Figure 1:
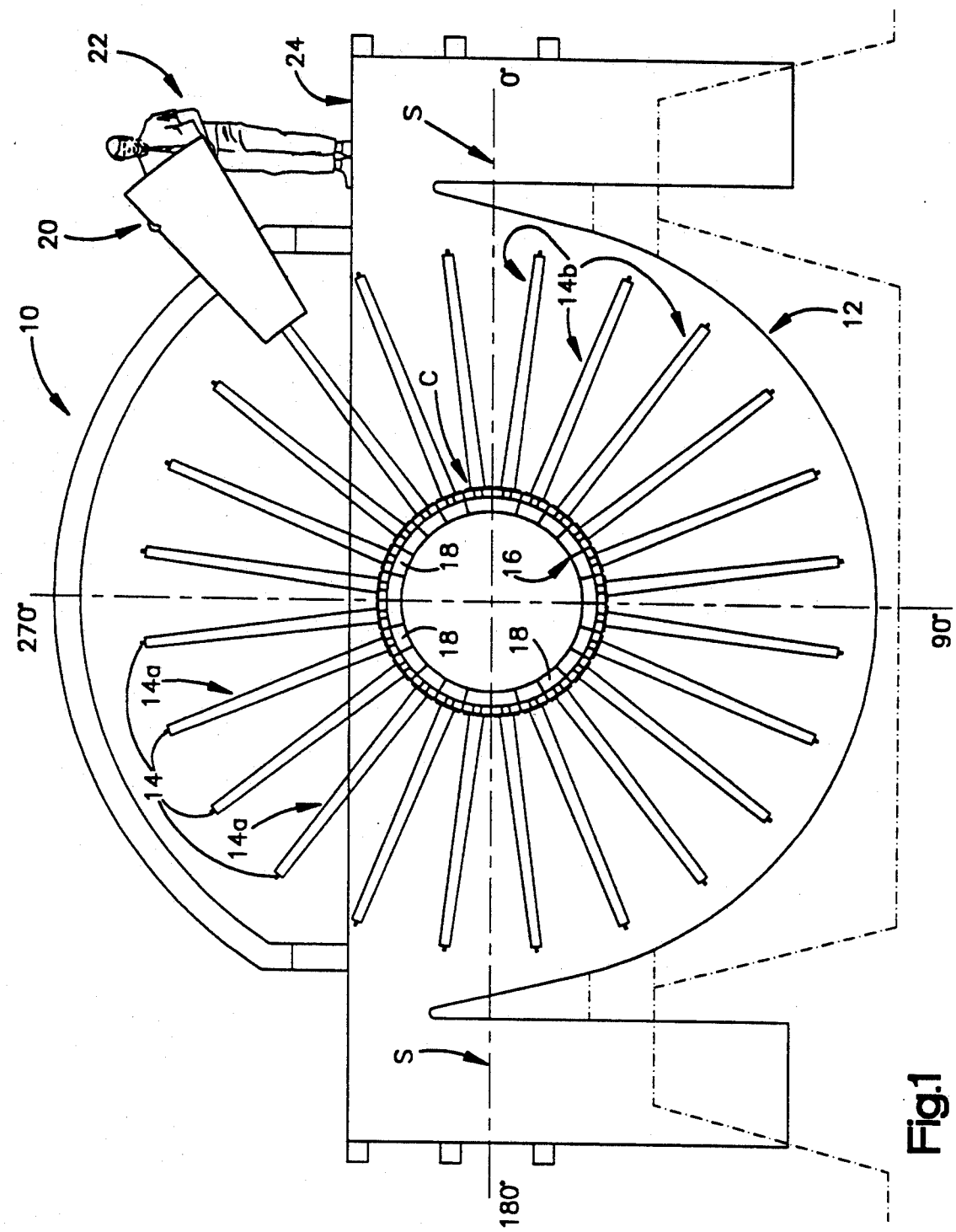
FIG. 1 is a cross-sectional end view of a disk filter employed in a filtration apparatus and utilizing the modular and removable sector in accordance with the invention.

With reference to FIG. 1, there is shown a cross-sectional end view of a typical disk filter installation operating in a vat 12 containing a slurry S. A plurality of support towers, which, in one of the embodiments incorporating drainage capability, are also hollow drainage towers 14, are affixed (by conventional means) to a rotatable hub 16 which also contains a plurality of core channels 18, one such core channel 18 for each support and/or drainage tower 14. Each drainage tower 14 is adapted to have mounted thereon, or demounted therefrom, a removable disk sector 20, having the general shape of a partially truncated V. Workers 22 can easily perform the required mounting, or demounting, from the periphery of the disk by standing on a supporting surface 24. It is to be noted that since drainage towers 14 are all fixed, more or less permanently, to the outer circumference C of hub 16, the removal, or fastening, of a sector 20 can be performed, by means to be subsequently illustrated, by operating only on the perimeter of the disk, and not within the crowded confines surrounding circumference C of the hub 16.

The general operation of the disk (it being understood that a plurality of these disks are spaced along the axis of rotation of hub 16) calls for each disk, comprised of a plurality of sectors 20 mounted on support and/or drainage towers 14, to rotate, in the direction of arrow A (for example) through a slurry S contained within vat 12. As each sector is submerged into the slurry at zero degrees of rotation, the pulp liquor portion of the slurry penetrates through the sector surfaces (by means to be subsequently described) and into the support tower drainage channels (to be subsequently described), if the drainage option is provided, within each drainage tower 14. Sometime after zero degrees, a differential pressure is applied to each submerged disc sector which leads not only to removal of filtrate accumulated in the hollow volume of both drainage tower 14 and sector 20, but also leads to an increasing accumulation on the surfaces of sector 20 of filtrate cake, i.e. that portion of the slurry which does not pass through any drainage channel. The filter cake build-up on sector 20 continues progressively from pressure application to emergence of a sector from the slurry at approximately 180°+.

When a particular sector 20 emerges from the slurry S at approximately 180° of the rotating cycle, the differential pressure is still being applied to remove filtrate. In addition to the application of differential pressure, the effects of gravity will also aid the drainage of each drainage tower 14 toward core channel 18.

At some point (shortly before or after 270°), pressure application is terminated and the resulting 20b is removed by a conventional so-called "knock-off shower" (not shown), which is common in the art. It is important that any filtrate left in the drainage tower 14 not cause re-wetting of the filter cake once the filter cake is stripped. Accordingly, features of the drainage tower 14 which minimize, or prevent, such re-wetting are provided, as subsequently described.

Figure 2:
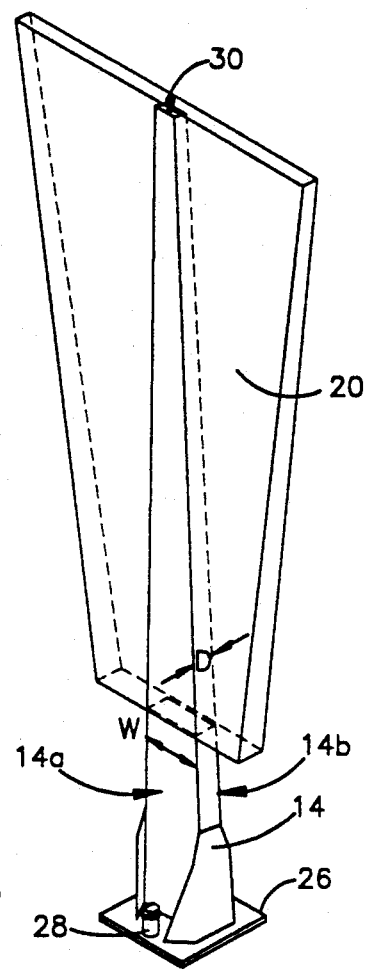
FIG. 2 is a perspective view of how a modular sector is detachably mounted on a support tower in accordance with the invention.
Figure 5:
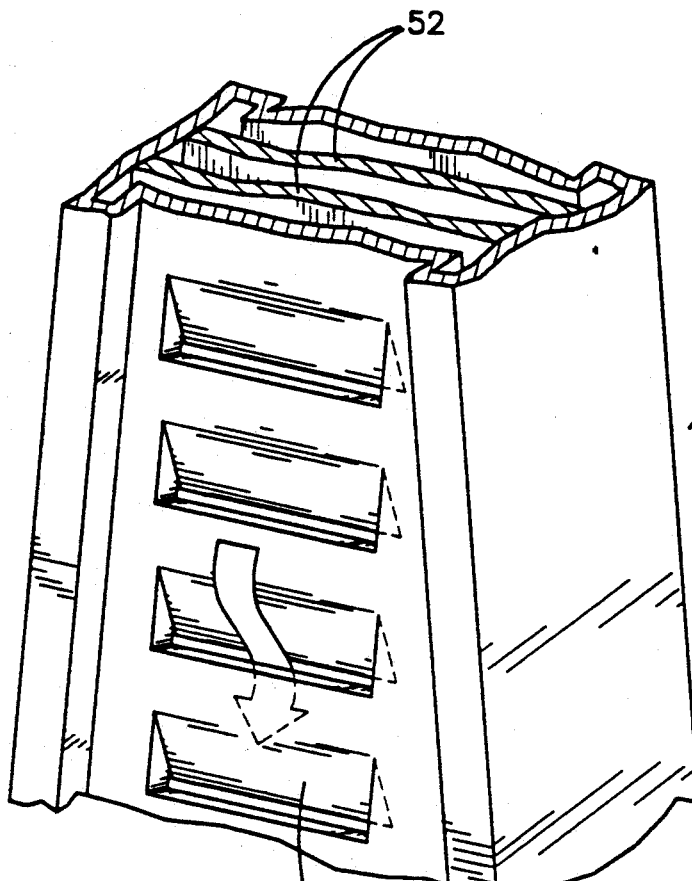
FIG. 5 is a partial perspective view illustrating anti re-wet features of a support tower with the drainage capability illustrated in FIG. 4 in accordance with the invention.
Figure 6:
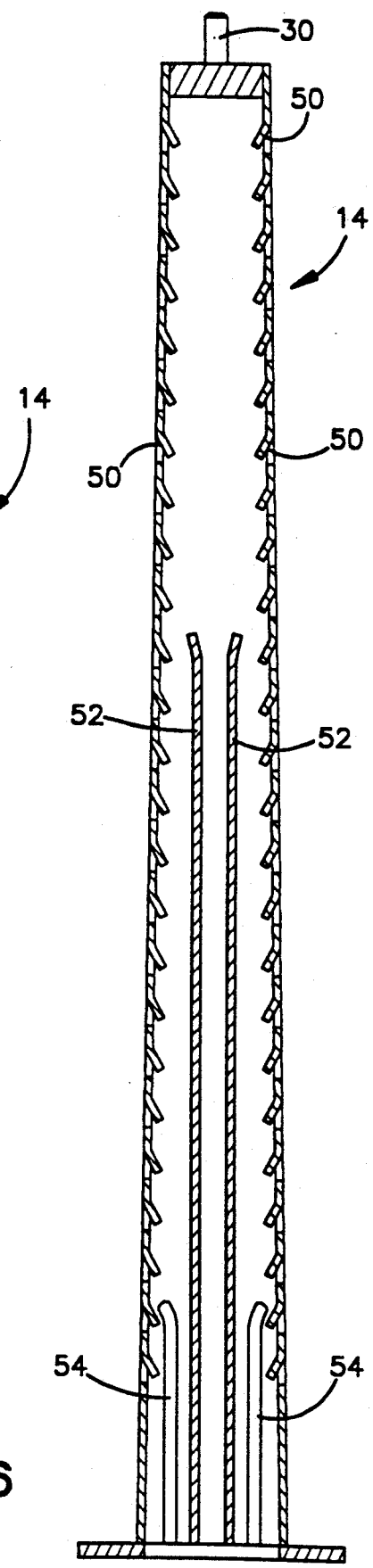
FIG. 6 is a cross-sectional view of a drainage tower showing greater detail of the anti re-wet features of a drainage tower in accordance with the invention.

With reference to FIG. 2, the drainage tower 14 is illustrated as having both a frontside 14a and backside 14b. Drainage tower 14, as shown in greater detail in FIGS. 4, 5, and 6, is hollow and has a width W and a depth D, both of which may decrease toward the tip of drainage tower 14 and which are maximum at its base, where a baseplate 26 forms the attachment point of drainage tower 14 to the rotatable hub 16 by means, such as a bolt 28. It is to be noted that each sector 20 is slidable along tower 14 which has, at its peripheral end, a threaded bolt 30 adapted to receive a nut 32, as shown in FIG. 3.

Figure 3:
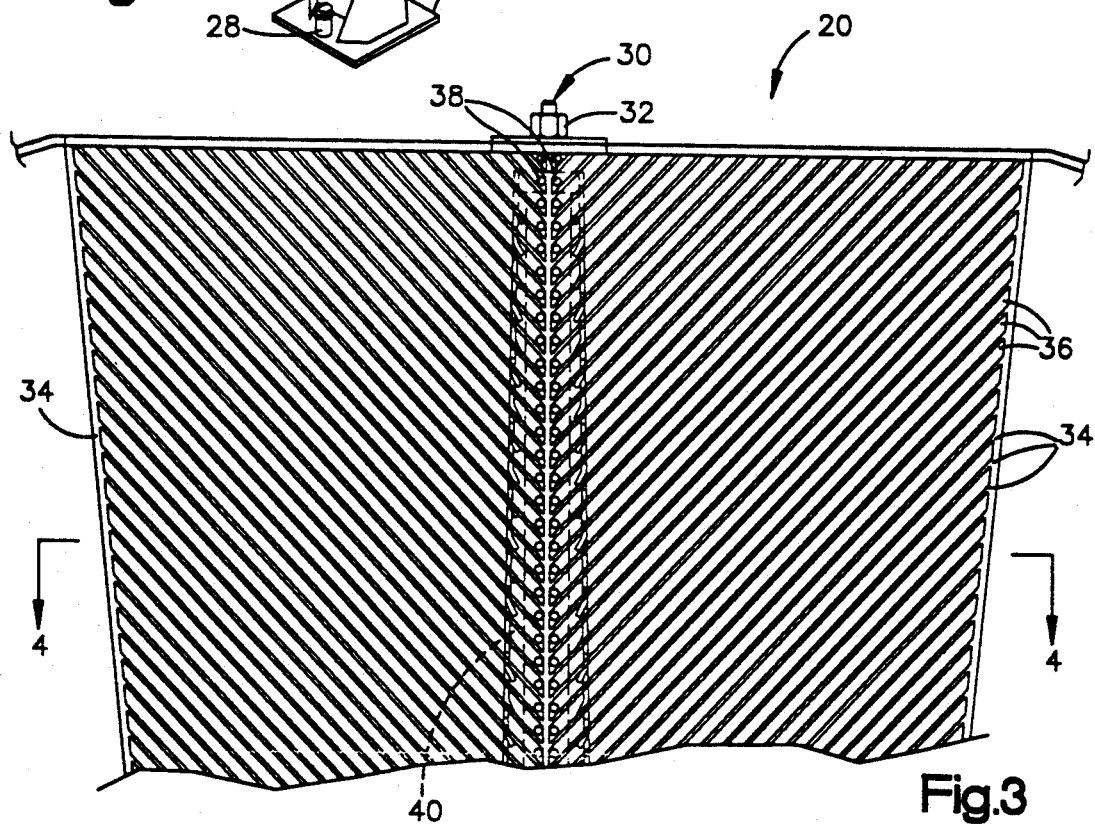
FIG. 3 is a schematic plan view of a portion of the sector illustrating the surface collection channels which lead filtrate into the collection bore of a sector.
Figure 4:
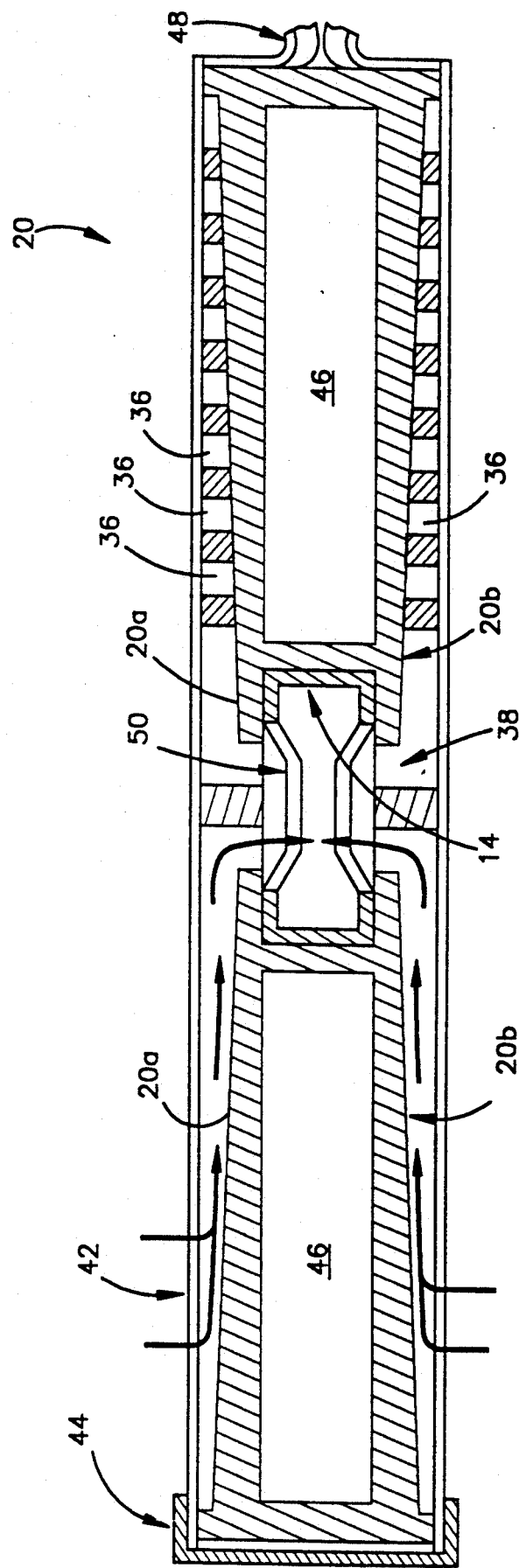
FIG. 4 is a cross-sectional view of a sector and a support tower having optional drainage capability along the lines 4—4 of FIG. 3.

With reference to FIGS. 3 and 4, each sector 20 has two edges 34 and a plurality of surface flow channels 36 formed, e.g. by corrugations, on the surfaces 20a and 20b of sector 20. Each surface flow channel 36 drains through suitable openings 38, also located on the surfaces 20a and 20b of sector 20 and into a central bore 40.

When a sector 20 is slipped over a tower 14, the cross-sectional view of FIG. 4 shows that the two surfaces 20a and 20b define filtrate flow paths through surface flow channels 36, and bores 38, into the hollow area of drainage tower 14, with the flow paths as indicated by the arrows in FIG. 4. Typically each sector 20 has its surface covered with a conventional screen cloth 42 designed to filter out fiber portions of the slurry and form the filter cake. A blinding strip 44 is commonly provided for each edge 34 of a disc filter sector 20. (although only one such blinding strip is shown in FIG. 4). It is noted that the corrugations forming the surface flow channels 36 also act as support for the screen cloth 42 which is then fastened by a conventional fastener 48 across the face of sector 20. Preferably, the surface flow channels 36 are angled, as shown in FIG. 3, from the edges 34 toward the base of sector 20.

Also shown in FIGS. 4 and 5, each drainage tower 14 has louvers 50 formed on both sides thereof, for reasons to be explained below.

It is to be noted that each sector 20, in addition to having a central bore 40 (shown as being mounted upon a drainage tower 14 in FIG. 4) also has internal volumes 46 adjacent to central bore 40. These internal volumes 46 are dealt with in different manners as described in copending U.S. Pat. application, of even filing date herewith and commonly assigned. These volumes 46 do not conduct filtrate to core channels 18. (See FIG. 1).

With reference to FIGS. 5 and 6, each tower 14 may have a plurality of louvers 50 spaced along its length and on both sides 14a and 14b to function as flow directors, reducing the volume of filtrate in the interior of the hollow drainage tower 14 which can emerge to re-wet the cake that's formed in the previously described manner. Each drainage tower 14 may also have in its interior one or a plurality of baffles 52, 54 (shown as an example) which prevent re-wetting, i.e., keep filtrate from escaping through the sides of drainage tower 14 and contaminating the dry cake. Essentially, baffles 52, 54 permanently trap filtrate, if any, left in the lower portions of drainage tower 14 after the knock-off operation (see FIG. 1) has started. The only exit for filtrate trapped within baffles 52, 54 is through the base of drainage tower 14 into the core channels 18 (FIG. 1). Drainage tower 14 is preferably constituted of stainless steel although it could also be made of a number of other materials. The sectors may also be made of the same materials, including molded polymers and stainless steel fabrications. The material selection is dictated by the strength and corrosion resistance requirements of the specific application. While the invention 20 has been illustrated with a drainage tower 14 fitting into the center of a sector 20, it is clearly within the scope of the invention to locate the drainage tower off-center, that is asymmetrically within a sector.

The invention has been described, generally, in terms of the support tower having drainage capability for the sector. It should be remembered that the support tower does not necessarily provide drainage between the disc surface and the hub core channels. In such cases, drainage connections are directly between the central bore 40 of sector 20 and core channels 18 of hub 16. In cases where the support tower provides no drainage, it may be hollow or solid as permitted by strength considerations.

While the invention has been particularly shown and described with reference to preferred embodiments thereof, it will be understood by those skilled in the art that the foregoing and other changes in form and details may be made therein without departing from the spirit and scope of the invention as defined in the claims appended hereto.

What is claimed is:

1. A disc filter for removing filtrate from a slurry, said disc filter having a plurality of sectors, wherein each sector comprises:

first and second surfaces having formed thereon a plurality of surface collection channels for collecting filtrate;

a radially oriented hollow bore formed in each sector along a radial centerline of said sector, the hollow bore being in flow communication with the surface collection channels; and means for enabling installation and removal of the sectors from the disc periphery mol structural support means, projecting radially outwardly from a rotatable hub of said disk filter and adapted to fit within said radially oriented hollow bore in each said sector, for securing said sector to said rotatable hub in a spaced relationship with respect to adjacent discs, for conducting filtrate from said sector to said rotatable hub, and for providing radially outboard installation and removal capability for each said sector.

2. Apparatus according to claim 1, wherein the structural support means is hollow and provides an internal drainage channel from said hollow bore of each said sector into core drainage channels in said rotatable hub on which said structural support means is mounted.

3. Apparatus according to claim 2, wherein said structural support means further comprises a base fixed to said rotatable hub, a certain length, lateral openings into its hollow interior, and baffle means, extending from the base within the hollow interior along part of the length, for reducing drainback of filtrate and rewetting of a filter cake formed on the disc sector.

4. Apparatus according to claim 2, wherein said hollow structural support means includes lateral openings such as louvers providing flow communication from the sector hollow bore, through the support means drainage channel, and thence, to the core drainage channels of the rotatable hub.

5. Apparatus according to claim 1, wherein the sector is formed from a solid homo-polymer surrounding the hollow bore.

6. Apparatus according to claim 1, wherein the sector is formed from a corrosion resistant metal alloy.

7. In a disc filter for removing filtrate from a slurry, the disc filter including a plurality of sectors mounted on a rotatable hub, said hub having core drainage channels, the improvement comprising:
means for enabling installation and removal of the sectors from the disc periphery including mounting means, radiating outwardly from said hub and nesting within a hollow bore in each said sector, for providing attachment and detachment capability for each said sector at an outer periphery of said disc.

8. The disc filter of claim 7, further comprising:
drainage means for passing filtrate from the disc sectors from said hollow bore, through said mounting means to the core drainage channels in the hub.

9. The disc filter of claim 8, wherein said drainage means has at least one interior baffle designed to trap filtrate and to decrease likelihood of said trapped filtrate escaping to re-wet filter cake formed on the sectors of the disc filter.

10. The disk filter of claim 7, wherein said mounting means comprises one or more hollow tubular members which are in flow communication with surface collection channels of each sector, by way of a hollow bore centrally located in the sector, and with the core drainage channels of the hub.

11. The disc filter of claim 10, wherein each of said one or more hollow tubular members of said mounting means includes one or more interior baffles means for reducing likelihood of rewetting of filter cake by backflow of filtrate.

* * * * *

UNITED STATES PATENT AND TRADEMARK OFFICE
CERTIFICATE OF CORRECTION

PATENT NO. : 5,242,590
DATED : 09/07/93
INVENTOR(S) : William F. Thomson, Alfred F. Blichmann, John E. Leddy, Frederick S. Lewis It is certified that error appears in the above—identified patent and that said Letters Patent is hereby corrected as shown below:

In claim 1, column 4, line 57, delete "mol", and replace with -- including -- .

Signed and Sealed this

Twelfth Day of April, 1994

Attest:

BRUCE LEHMAN

Attesting Officer     Commissioner of Patents and Trademarks